US009312558B2

(12) United States Patent
Suto et al.

(10) Patent No.: US 9,312,558 B2
(45) Date of Patent: Apr. 12, 2016

(54) FUEL CELL, METHOD FOR MANUFACTURING THE SAME, AND APPLICATION APPARATUS USED FOR MANUFACTURING THE SAME

(71) Applicant: MITSUBISHI HITACHI POWER SYSTEMS, LTD., Yokohama, Kanagawa (JP)

(72) Inventors: Takanori Suto, Tokyo (JP); Katsuhiko Maeda, Tokyo (JP); Kenichi Hiwatashi, Tokyo (JP); Seiji Goto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/560,848

(22) Filed: Dec. 4, 2014

(65) Prior Publication Data

US 2015/0162636 A1 Jun. 11, 2015

(30) Foreign Application Priority Data

Dec. 6, 2013 (JP) .................................. 2013-253118
Jan. 31, 2014 (JP) .................................. 2014-017197

(51) Int. Cl.
*H01M 2/20* (2006.01)
*H01M 8/24* (2006.01)
*H01M 8/02* (2006.01)
*H01M 8/12* (2006.01)

(52) U.S. Cl.
CPC ............ *H01M 8/243* (2013.01); *H01M 8/0297* (2013.01); *H01M 8/124* (2013.01); *H01M 2008/1293* (2013.01); *Y02P 70/56* (2015.11)

(58) Field of Classification Search
CPC .................. H01M 2008/1293; H01M 8/0297; H01M 8/124; H01M 8/243
See application file for complete search history.

(56) References Cited

U.S. PATENT DOCUMENTS

2006/0115710 A1* 6/2006 Kusakabe ........... H01M 8/0247
429/437
2008/0131586 A1 6/2008 Hama
2014/0030626 A1 1/2014 Soh et al.

FOREIGN PATENT DOCUMENTS

JP 3-91998 A 4/1991
JP 2010-167322 A 8/2010
JP 2013-175305 A 9/2013

* cited by examiner

*Primary Examiner* — Patrick Ryan
*Assistant Examiner* — Ben Lewis
(74) *Attorney, Agent, or Firm* — Westerman, Hattori, Daniels & Adrian, LLP

(57) ABSTRACT

In a fuel cell, a cell 105 including an anode 109, a solid electrolyte film 111 and a cathode 113 on an outer peripheral surface of a substrate tube 103 is formed in a circumferential direction of the substrate tube 103. A plurality of the cells 105 are arranged along a longitudinal direction of the substrate tube 103, and an interconnector 107 connecting the cells 105 electrically in series is formed between the adjacent cells 105. A thickness of an end portion of the cathode 113 in the longitudinal direction, the portion being in contact with the interconnector 107, is larger than a thickness of a center portion of the cathode 113 in the longitudinal direction. Thereby, high power generation performance can be achieved.

13 Claims, 11 Drawing Sheets

FUEL CELL, METHOD FOR MANUFACTURING THE SAME, AND APPLICATION APPARATUS USED FOR MANUFACTURING THE SAME

CROSS REFERENCE TO RELATED APPLICATIONS

This application claims the benefit of Japanese Patent Application Nos. 2013-253118 and 2014-017197, the content of which are incorporated herein by reference.

BACKGROUND OF THE INVENTION

1. Field of the Invention

The present invention relates to a fuel cell which has a cylindrical shape in which a plurality of cells are formed on a substrate tube, a method for manufacturing the same, and an application apparatus used for manufacturing the same.

2. Description of Related Art

A solid oxide fuel cell (hereinafter, referred to as "SOFC") is a fuel cell in which ceramics such as zirconia ceramics are used as an electrolyte, and city gas, natural gas, petroleum, methanol, coal gasified gas and the like are used as a fuel in order to operate the fuel cell. As one of SOFCs, a cylindrical fuel cell is known. A cylindrical fuel cell contains a plurality of cell stacks inside a power generating chamber. In a cell stack, a plurality of cells including an anode (a fuel electrode), a solid electrolyte film and a cathode (an air electrode) stacked in a circumferential direction of a substrate tube are formed. The plurality of cells are arranged in an axial direction of the substrate tube, and the adjacent cells are electrically connected in series via an interconnector.

On manufacturing the aforementioned cylindrical fuel cell, the anode, the solid electrolyte film and the interconnector are first formed on the substrate tube. Thereafter, the anode, the solid electrolyte film and the interconnector as well as the substrate tube are co-sintered. The cathode is formed on the solid electrolyte film after it has been co-sintered.

The surface of the co-sintered substrate tube is uneven since the anode and the like are formed thereon. Further, the substrate tube may be warped in a longitudinal direction. Therefore, in Japanese Unexamined Patent Application, Publication No. 2013-175305, instead of screen printing, a dispenser is used to form a cathode so that the cathode having a uniform film thickness is formed on the uneven substrate tube. Further, the fine adjustment of a discharge position of the dispenser is possible, and thus, the accuracy of forming the film can be improved.

As a conventional method for applying an application material, methods disclosed by Japanese Unexamined Patent Application, Publication No. Hei 3-91998 and Japanese Unexamined Patent Application, Publication No. 2010-167322, for example, are known. Japanese Unexamined Patent Application, Publication No. Hei 3-91998 discloses a technique in which, when chip-shaped electronic components such as a resistor, a capacitor and a transistor, are temporarily fixed at respective predetermined positions on a printed board, an adhesive is applied on the board by taking a warp, a curve, a level difference and the like of the board into consideration. More specifically, Japanese Unexamined Patent Application, Publication No. Hei 3-91998 discloses that a noncontact distance sensor such as a laser displacement sensor is attached to an applying head part discharging an adhesive, distance measured by the distance sensor is fed back as an elevating/lowering amount of the applying head, whereby stable attachment operation such as application of the adhesive to the printed board are performed.

Japanese Unexamined Patent Application, Publication No. 2010-167322 discloses that by using not a noncontact distance sensor such as a laser displacement sensor but a contact distance sensor which is cheaper, application of an adhesive is performed.

As illustrated in FIG. 6 of Japanese Unexamined Patent Application, Publication No. 2013-175305, in the cathode formed by the method disclosed by Japanese Unexamined Patent Application, Publication No. 2013-175305, both end portions in the longitudinal direction of the substrate tube have gentle slopes. At the ends of the cathode, the film thickness of the cathode decreases toward a portion connected with the interconnector. The portion having a thinner film of the cathode has low electrical conductivity, and therefore, a conductive path becomes thin and connection resistance with the interconnector becomes large, as a result. The shape of the cathode described above causes decrease in power generating performance.

In order to obtain a sufficient conductive path with an interconnector with a cathode having the shape disclosed by Japanese Unexamined Patent Application, Publication No. 2013-175305, a size of each cell is required to be large, whereby resulting in decrease in effective power generation area capable of contributing to power generation. Therefore, there is a limit to increase in power generation amount with one cell stack.

In the processing for forming the cathode described above, on an outer surface of the cylindrical cell stack, slurry for cathodes is applied so as to have a stripe pattern with intervals. Here, since the cell stack has a long body, for example, with a length of one meter or more, the center part of the cell stack is warped by the gravity. Moreover, since application of the slurry for cathodes is performed with the cell stack rotated around an axis, the rotation causes even displacement of the axis.

In order to cope with such displacement of the axis, slurry for cathodes is, conventionally, sprayed on an outer peripheral surface from a slightly distant place. In application of slurry for cathodes by spraying, however, it requires a long time for the slurry for cathodes to have a desired film thickness. Also, since spraying makes a machine worn out, the exchange frequency of components of the machine increases, resulting in a problem that the cost is increased.

Such problem is not specific to a SOFC, and the problem often occurs in a case where an application material is applied on an outer peripheral surface of a rotating cylindrical member.

The present invention has been made in view of the aforementioned problem, and the object thereof is to provide a fuel cell which has high power generation performance, a method for manufacturing the same, and an application apparatus used for manufacturing the same.

Another object of the present invention is to provide an application apparatus capable of applying an application material to a cylindrical member rotating around an axis (e.g., a substrate tube), with low cost, efficiently, and with a stable quality.

BRIEF SUMMARY OF THE INVENTION

A first aspect of the present invention is a fuel cell comprising: a cell stack in which a cell including an anode, a solid electrolyte film and a cathode on an outer peripheral surface of a substrate tube is formed in a circumferential direction of the substrate tube, a plurality of the cells are arranged along a longitudinal direction of the substrate tube, and an interconnector connecting the cells electrically in series is formed between the adjacent cells, wherein a thickness of an end portion of the cathode in the longitudinal direction, the portion being in contact with the interconnector, is larger than a thickness of a center portion of the cathode in the longitudinal direction.

In the first aspect, preferably, the thickness of the end portion of the cathode is more than 1 and 1.5 or less times the thickness of the center portion of the cathode.

In the first aspect, preferably, the end portion of the cathode in the longitudinal direction has a sharp slope.

A second aspect of the present invention is an application apparatus used for manufacturing the aforementioned fuel cell, comprising: a dispenser including an opening portion disposed at a position opposite to the outer peripheral surface of the substrate tube attached in a rotatable manner around an axis, the dispenser discharging slurry for cathodes from the opening portion and applying the slurry for cathodes to predetermined positions on the anode, the solid electrolyte film and the interconnector, wherein the dispenser applies the slurry for cathodes so as to make the thickness of the end portion in the longitudinal direction, the portion being in contact with the interconnector, larger than the thickness of the center portion in the longitudinal direction.

The aforementioned application apparatus may further include: an opening position adjustment portion disposed so as to correspond to the dispenser and allowing change of a position of the opening portion; a displacement amount acquiring portion acquiring a displacement amount of the outer peripheral surface at the time of rotating the substrate tube at a predetermined application position in an axial direction of the substrate tube; a storage portion storing adjustment information associated with the displacement amount and a rotation angle around an axis; and a control portion controlling the opening position adjustment portion in conjunction with rotation of the substrate tube so as to fix a distance between the outer peripheral surface of the substrate tube and the opening portion based on the adjustment information stored in the storage portion, on application of the slurry for cathodes.

According to the aforementioned application apparatus, the opening portion of the dispenser is disposed at the position opposite to the outer peripheral surface of the substrate tube rotating around the axis and an application material is discharged from the opening portion, and thus, the application material is applied to the outer peripheral surface of the substrate tube. The dispenser is provided with the opening position adjustment portion allowing change of the position of the opening portion. Before the application of the slurry for cathodes, a displacement amount of the outer peripheral surface when the substrate tube is rotated is acquired by the displacement amount acquiring portion, and the adjustment information associated with the displacement amount and the rotation angel around the axis is created, and the adjustment information is stored in the storage portion. On the application of the slurry for cathodes, the control portion controls the opening position adjustment portion in conjunction with rotation of the substrate tube so as to fix the distance between the outer peripheral surface of the substrate tube and the opening portion based on the adjustment information stored in the storage portion. Accordingly, even if the substrate tube is warped by the gravity or the rotation causes displacement of the position of the outer peripheral surface, the distance between the outer peripheral surface and the opening portion is maintained to be substantially fixed, and thus, a substantially fixed width of the application material can be applied on the outer peripheral surface of the substrate tube. Furthermore, according the present aspect, since a certain width of slurry for cathodes is discharged from the opening portion to be applied, a time period required for the application can be reduced compared with the conventional method in which slurry for cathodes is sprayed. Moreover, even wear of a machine is small compared with a case in which slurry for cathodes is sprayed, and thus, the exchange frequency of components decreases and cost reduction can be promoted.

The aforementioned application apparatus may have a configuration in which a plurality of the application positions are set with intervals therebetween along the axial direction of the substrate tube, the dispensers are each disposed so as to correspond to the respective application positions, and the control portion controls the opening position adjustment portion corresponding to each of the dispensers based on the adjustment information prepared for each of the application positions.

According to the aforementioned application apparatus, since the dispensers are each disposed so as to correspond to the respective application positions which are set in the axial direction of the substrate tube, efficient application is possible.

The aforementioned application apparatus may have a configuration in which N number of the application positions are set with intervals therebetween along the axial direction of the substrate tube, one or M number (M<N) of the dispensers are sequentially disposed at the N number of the application positions by sliding in the axial direction of the substrate tube, and the control portion controls the opening position adjustment portion corresponding to each of the dispensers based on adjustment information prepared for each of the application positions.

According to the aforementioned application apparatus, the slurry for cathodes is applied to each of the application positions by sliding one or M number of the dispensers in the axial direction of the substrate tube, and thus, application of the slurry for cathodes can be performed by setting a small number of the dispensers. Accordingly, cost reduction can be promoted.

In the aforementioned application apparatus, the displacement amount acquiring portion may be provided to each dispenser.

Since the dispenser is provided with the displacement amount acquiring portion, a displacement amount at the application position can be measured easily and efficiently. Further, a displacement amount of the outer peripheral surface can be measured by rotating the substrate tube in a state where the opening portion is disposed at a predetermined application position. Thereby, since the position of the opening portion remains unchanged between at the time of measurement and at the time of application, a deviation caused by displacement of the position of the opening portion can be reduced.

A third aspect of the present invention is a method for manufacturing a fuel cell including a cell stack in which a cell including an anode, a solid electrolyte film and a cathode on an outer peripheral surface of a substrate tube is formed in a circumferential direction of the substrate tube, a plurality of the cells are arranged along a longitudinal direction of the substrate tube, and an interconnector connecting the cells electrically in series is formed between the adjacent cells, the method comprising: an application step of discharging slurry for cathodes to configure the cathode on the outer peripheral surface of the substrate tube from an opening portion of a dispenser by rotating the substrate tube in the circumferential direction and applying the slurry for cathodes to predetermined positions on the anode, the solid electrolyte film and the interconnector; and a sintering step of sintering the substrate tube on which the slurry for cathodes is applied, wherein in the application step, the slurry for cathodes is applied so as to make a thickness of an end portion in the longitudinal direction, the end portion being in contact with the interconnector, larger than a thickness of a center portion in the longitudinal direction.

In the aforementioned method for manufacturing a fuel cell, the slurry for cathodes may be discharged so as to make the thickness of the end portion more than 1 and 1.5 or less times the thickness of the center portion.

In the aforementioned method for manufacturing a fuel cell, the slurry for cathodes may be applied such that the end portion in the longitudinal direction has a sharp slope.

According to the aforementioned method for manufacturing a fuel cell, since the contact portion of the cathode with the interconnector is formed to be thick, the electrical conductivity of the cathode is fixed over the contact portion, and thus, the widened conductive path reduces connection resistance so that the electrical conductivity of the cell stack is improved. On the other hand, since the film thickness of the center portion of the cathode is smaller than that of the contact portion with the interconnector, transmittance of oxidation gas is made to be easy and the reaction at the solid electrolyte film is accelerated. As a result, in the prevent invention, power generation performance of the fuel cell can be improved.

In the aforementioned method for manufacturing a fuel cell, the application step may include: a step of acquiring a displacement amount of the outer peripheral surface of the substrate tube at the time of rotating the substrate tube at a predetermined application position in an axial direction of the substrate tube; a step of creating adjustment information associated with the displacement amount and a rotation angle around an axis; and a step of adjusting a position of the opening portion in conjunction with rotation of the substrate tube so as to fix a distance between the outer peripheral surface of the substrate tube and the opening portion based on the adjustment information, on application of the slurry for cathodes.

The aforementioned method for manufacturing a fuel cell may include: a step of setting a plurality of the application positions with intervals therebetween along the axial direction of the substrate tube; a step of disposing the dispensers so as to correspond to the respective application positions; and a step of adjusting a distance between the respective opening portions and the outer peripheral surface of the substrate tube based on the adjustment information prepared for each of the application positions.

The aforementioned method for manufacturing a fuel cell may include: a step of setting N number of the application positions with intervals therebetween along the axial direction of the substrate tube; a step of disposing sequentially one or M number (M<N) of the dispensers at the N number of the application positions by sliding in the axial direction of the substrate tube; and a step of adjusting a distance between the respective opening portions of the dispensers and the outer peripheral surface of the substrate tube based on the adjustment information prepared for each of the application positions.

Another aspect for illustrating the present invention is an application apparatus including: an applying portion including an opening portion disposed at a position opposite to an outer peripheral surface of a cylindrical member attached in a rotatable manner around an axis, the applying portion discharging an application material from the opening portion and applying the application material to the outer peripheral surface of the cylindrical member; an opening position adjustment portion disposed so as to correspond to the applying portion and allowing change of a position of the opening portion; a displacement amount acquiring portion acquiring a displacement amount of the outer peripheral surface at the time of rotating the cylindrical member at a predetermined application position in an axial direction of the cylindrical member; a storage portion storing adjustment information associated with the displacement amount and a rotation angle around the axis; and a control portion controlling the opening position adjustment portion in conjunction with rotation of the cylindrical member so as to fix a distance between the outer peripheral surface of the cylindrical member and the opening portion based on the adjustment information stored in the storage portion, on application of the application material.

According to the aforementioned aspect, the opening portion of the applying portion is disposed at the position opposite to the outer peripheral surface of the cylindrical member rotating around the axis, the application material is discharged from the opening portion, and thus, the application material is applied to the outer peripheral surface of the cylindrical member. The applying portion is provided with the opening position adjustment portion allowing change of the position of the opening portion. Before the application of the application material, a displacement amount of the outer peripheral surface when the cylindrical member is rotated is acquired by the displacement amount acquiring portion, and the adjustment information associated with the displacement amount and the rotation angel around the axis is created, and the adjustment information is stored in the storage portion. On the application of the application material, the control portion controls the opening position adjustment portion in conjunction with rotation of the cylindrical member so as to fix the distance between the outer peripheral surface of the cylindrical member and the opening portion based on the adjustment information stored in the storage portion. Accordingly, even if the cylindrical member is warped by the gravity or the rotation causes displacement of the position of the outer peripheral surface, the distance between the outer peripheral surface and the opening portion can be maintained to be fixed, and thus, a substantially fixed width of the application material can be applied to the outer peripheral surface of the cylindrical member. Furthermore, according the present aspect, since a certain width of the application material is discharged from the opening portion to be applied, a time period required for the application can be reduced compared with the conventional method in which an application material is sprayed. Moreover, even wear of a machine is small compared with a case in which an application material is sprayed, and thus, the exchange frequency of components decreases and cost reduction can be promoted.

Still another aspect for illustrating the present invention is an application method for applying an application material to an outer peripheral surface of a cylindrical member by disposing an opening portion of an applying portion at a position opposite to the outer peripheral surface of the cylindrical member rotating around an axis and discharging the application material from the opening portion, the method comprising: a step of acquiring a displacement amount of the outer peripheral surface of the cylindrical member at the time of rotating the cylindrical member at a predetermined application position in an axial direction of the cylindrical member; a step of creating adjustment information associated with the displacement amount and a rotation angle around the axis; and a step of adjusting a position of the opening portion in conjunction with rotation of the cylindrical member so as to fix a distance between the outer peripheral surface of the cylindrical member and the opening portion based on the adjustment information, on application of the application material.

The aforementioned other aspect provides an effect that an application material can be applied to a cylindrical member rotating around an axis, with low cost, efficiently, and with a stable quality.

According to the present invention, contact resistance between the cathode and the interconnector is improved and reaction at the solid electrolyte film is accelerated, and thus, a fuel cell having high power generation performance is possible.

DETAILED DESCRIPTION OF THE INVENTION

Hereinafter, for convenience of explanation, a positional relationship among the respective components is specified with use of the expression "up" and "down" based on a sheet, but such limitation is not necessarily applied to the vertical direction. For example, an upward direction in the sheet may correspond to a downward direction in the vertical direction. Also, an upward/downward direction in a sheet may correspond to a horizontal direction orthogonal to the vertical direction.

Hereinafter, description will be given of a fuel cell and a method for manufacturing the fuel cell according to an embodiment of the present invention, and then, description will be given of embodiments of an application apparatus according to the present invention.

Figure 1:
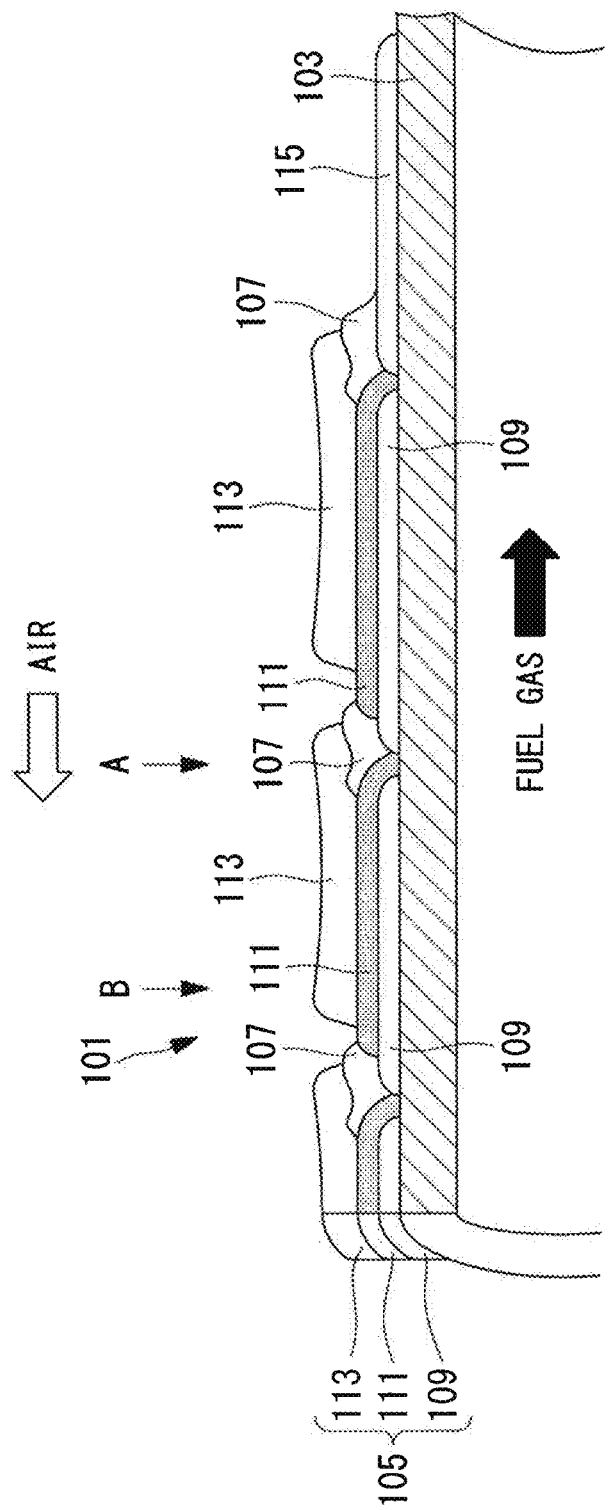
FIG. 1 is a partial cross-sectional diagram of a cell stack of a cylindrical fuel cell according to an embodiment of the present invention.

FIG. 1 is a partial cross-sectional diagram of a cell stack of a cylindrical fuel cell according to an embodiment of the present invention. The cylindrical fuel cell contains a plurality of cell stacks 101 of the present embodiment in a power generating chamber.

The cell stack 101 includes a cylindrical substrate tube 103, a plurality of fuel cells 105 formed on an outer peripheral surface of the substrate tube 103, and an interconnector 107 formed between the adjacent fuel cells 105. The fuel cell 105 is formed by stacking an anode 109, a solid electrolyte film 111 and a cathode 113. Further, the cell stack 101 includes a lead film 115 which is electrically connected, via the interconnector 107, to the cathode 113 of the fuel cell 105 formed at an endmost position in an axial direction of the substrate tube 103 of the plurality of the fuel cells 105 formed on the outer peripheral surface of the substrate tube 103. Any of the fuel cells 105, the interconnectors 107, and the lead films 115 are formed in a belt shape over an entire circumferential direction of the outer peripheral surface of the substrate tube 103.

At one end portion A (the end portion at the right-side of the fuel cell 105 in the sheet of FIG. 1) of the fuel cell 105, the solid electrolyte film 111 is formed on the anode 109, and the interconnector 107 is formed on the solid electrolyte film 111. At the other end portion B (the end portion at the left-side of the fuel cell 105 in the sheet of FIG. 1) of the fuel cell 105, the interconnector 107 is in contact with the solid electrolyte film 111 of one fuel cell 105, and also in contact with the anode 109 of the same fuel cell 105.

The substrate tube 103 is formed of a porous material, for example, CaO-stabilized $ZrO_2$ (CSZ), $Y_2O_3$-stabilized $ZrO_2$ (YSZ), or $MgAl_2O_4$. The substrate tube 103 supports the fuel cell 105, the interconnector 107 and the lead film 115, and further diffuses a fuel gas supplied to an inner peripheral surface of the substrate tube 103 over the anode 109 formed on the outer peripheral surface of the substrate tube 103 through fine holes of the substrate tube 103.

The anode 109 is configured by an oxide of a composite of Ni and a zirconia-based electrolyte material, and, for example, Ni/YSZ is used. In this case, in the anode 109, Ni which is a component of the anode 109 provides a catalytic action for the fuel gas. This catalytic action involves reacting the fuel gas supplied via the substrate tube 103, e.g., a mixed gas of methane ($CH_4$) and steam and reforming the mixed gas to hydrogen ($H_2$) and carbon monoxide (CO). Also, the anode 109 reacts hydrogen ($H_2$) and carbon monoxide (CO) obtained by the reformation with oxygen ions ($O^{2-}$) supplied via the solid electrolyte film 111 electrochemically at a vicinity of an interface with the solid electrolyte film 111 so that water ($H_2O$) and carbon dioxide ($CO_2$) are generated. At that time, the fuel cell 105 generates power with electrons emitted from the oxygen ions.

For the solid electrolyte film 111, YSZ is mainly used, which has airtightness to prevent a gas from passing and high oxygen-ion conductivity at a high temperature. The solid electrolyte film 111 moves the oxygen ions ($O^{2-}$) generated in the cathode to the anode.

The cathode 113 is configured by, for example, a LaSrMnO$_3$-based oxide or a LaCoO$_3$-based oxide. The cathode 113 dissociates oxygen included in a supplied oxidized gas such as air at a vicinity of an interface with the solid electrolyte film 111 so that oxygen ions ($O^{2-}$) are generated.

In the present embodiment, a cathode reactive layer may be formed at the side of the substrate tube 103 of the cathode 113. The cathode reactive layer serves as an adhesion layer between the cathode and the solid electrolyte film, or serves to promote a further electrochemical reaction. The cathode reactive layer is configured by, for example, $CeO_2$ in which Sm is doped.

The interconnector 107 is configured by a conductive perovskite-type oxide which is expressed by $M_{1-x}L_xTiO_3$ (wherein M represents an alkaline-earth metal element, and L represents a lanthanoid element), e.g., a $SrTiO_3$ base, and the interconnector 107 is a dense film to prevent a fuel gas and an oxidized gas from being mixed. Also, the interconnector 107 has electrical conductivity which is stable under both an oxidation atmosphere and a reduction atmosphere. In the adjacent fuel cells 105, the interconnector 107 electrically connects the cathode 113 of one fuel cell 105 and the anode 109 of the other fuel cell 105 to connect the adjacent fuel cells 105 in series. The lead film 115 is required to have electron conductivity and to have a coefficient of thermal expansion close to that of other materials included in the cell stack 101, and thus, the lead film 115 is configured by a composite of Ni and a zirconia-based electrolyte material such as Ni/YSZ. The lead film 115 derives DC power, which is generated by the plurality of fuel cells 105 connected in series via the interconnector, to the vicinity of the end portion of the cell stack 101.

Figure 2:
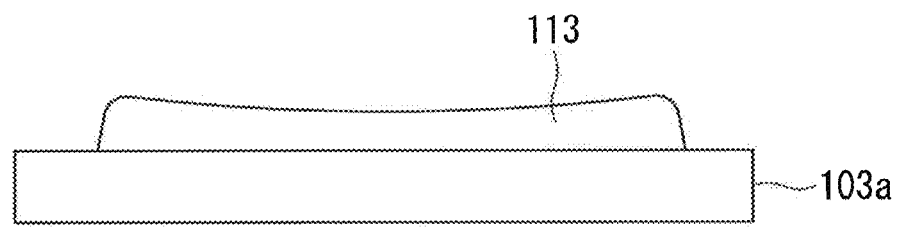
FIG. 2 is a schematic cross-sectional diagram illustrating a case where only a cathode of the present invention is formed on a smooth surface.

FIG. 2 is a schematic cross-sectional diagram illustrating the cathode cut in a longitudinal direction of the substrate tube, when only the cathode 113 of the present embodiment is formed on a smooth surface 103a in a circumferential direction of the substrate tube. The smooth surface 103a in FIG. 2 is a smooth surface in the state where nothing is applied on the substrate tube 103.

A center portion of the cathode 113 of the present embodiment has a flat surface of the cathode 113. At the center portion, the cathode 113 is from 1000 μm to 3000 μm. The film thickness is almost equal to a lower limit value of a film thickness designed for a cathode in the conventional fuel cell.

In the case of providing a cathode reactive layer, for the total film thickness of the cathode reactive layer and the cathode, a film thickness within the aforementioned range is secured at the center portion of the cathode.

The cathode 113 of the present embodiment has thick both end portions of the cathode 113 in the longitudinal direction of the substrate tube 103. That is, a portion of the cathode 113 in contact with the interconnector 107 has a larger film thickness than the center portion (a portion which is stacked on the anode 109 and the solid electrolyte film 111 to form the fuel cell 105) of the cathode 113 in the longitudinal direction of the substrate tube 103.

When the film thickness of the center portion of the cathode 113 is $d_0$ and the film thickness of the portion of the cathode 113 in contact with the interconnector 107 is $d_1$, the cathode 113 is formed to hold $1.0 < d_1/d_0 \leq 1.5$. Since the end portion including the portion of the cathode 113 in contact with the interconnector is likely to be peeled off, $d_1/d_0 > 1.5$ is not preferable.

Further, at the both end portions of the cathode 113 in the longitudinal direction of the substrate tube 103, the cathode 113 has a sharp slope. More specifically, if a distance between a terminal position of the cathode 113 and a position of the cathode 113, which is in proximity to the terminal position, having a largest thickness is defined as L and the maximum film thickness of the cathode 113 at the position in proximity to the terminal position is defined as H, H/L is from 2.0 to 10.0. An H/L of less than 2 is inappropriate. This is because such a thin film thickness results in decrease in the current passing cross-sectional area of the contact portion with the interconnector, and thus, the passing resistance is increased. If H/L is larger than 10, a sharp configuration of the end portion of the cathode easily causes damage of the cathode, and also, manufacturing the cathode so as to have such a sharp shape is difficult and inappropriate.

Figure 3:
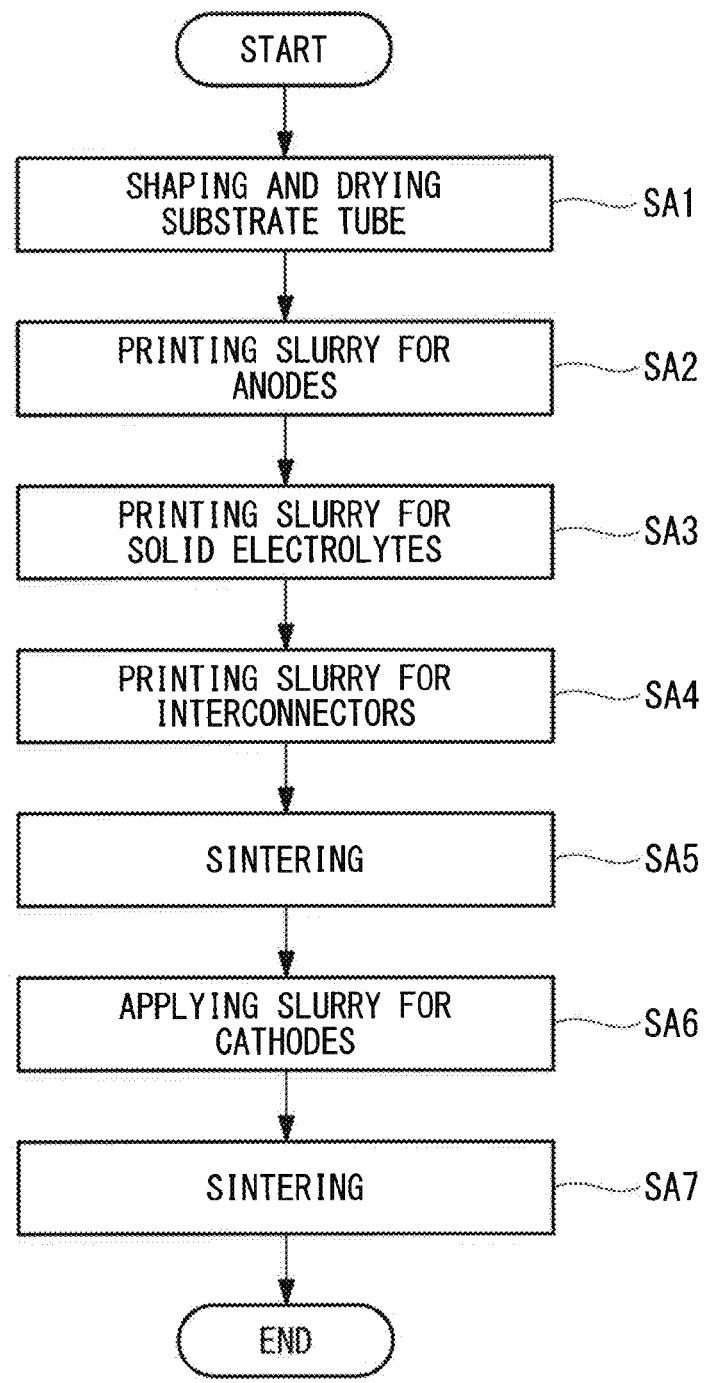
FIG. 3 is a flowchart illustrating a method for manufacturing the fuel cell according to the embodiment of the present invention.

Description will be given of a method for manufacturing the fuel cell of the present embodiment with reference to FIG. 3.

(Printing of Slurry)

First, the substrate tube 103 is molded into a tube-like shape by an extrusion molding method and then dried (SA1). The outer diameter of the substrate tube 103 is preferably a diameter of 12 mm to 37 mm. The whole length of the substrate tube 103 is, for example, approximately 1 m to 2 m.

Then, slurry for anodes or slurry for lead films is printed on the outer peripheral surface of the substrate tube 103 by a screen printing method (SA2). In the present embodiment, the subsequent processing will be described, assuming that slurry for anodes is printed. Slurry for the anode 12 is prepared by adding a vehicle such as squeegee oil to mixed powder of NiO and yttria-stabilized zirconia (YSZ) and mixing the resultant mixture with a three-roller. In printing of the slurry for anodes, at least one end portion of the substrate tube 103 may be shifted inward to expose the end portion of the substrate tube 103.

Then, slurry for solid electrolytes is printed on the slurry for anodes by a screen printing method (SA3). The slurry for solid electrolytes is prepared by adding a vehicle such as squeegee oil to YSZ powder and mixing the resultant mixture with a three-roller. In printing of the slurry for solid electrolytes, at least one end portion of the substrate tube 103 may be shifted inward to expose the slurry for anodes.

Then, slurry for interconnectors is printed on the above exposed slurry for anodes so as to cover the exposed slurry for anodes completely, by a screen printing method (SA4). The slurry for interconnectors is adjacent with the slurry for solid electrolytes. Furthermore, the slurry for interconnectors is printed at appropriate positions such that adjacent power generating cells are electrically connected in series on the substrate tube 103. The slurry for interconnectors is prepared by adding a vehicle such as squeegee oil to lanthanum-doped strontium titanate ($Sr_{1-x}La_xTiO_3$) powder and mixing the resultant mixture by a three-roller.

(Sintering)

The substrate tube 103 on which the slurry for anodes, the slurry for solid electrolytes and the slurry for interconnectors are printed is co-sintered in the atmosphere (SA5). For example, the substrate tube 103 is co-sintered in an electric furnace in a suspended state. The sintering temperature is set specifically within 1350 C to 1450 C. This is because the electrolytes and the interconnector are not sintered at a temperature of less than 1350 C to cause a possibility of impairing airtightness, and the anode and the substrate tube are further densified at a temperature of more than 1450 C to cause a possibility of impairing gas permeability and lowering the power generation performance. In this way, the anode 109, the solid electrolyte 111, and the interconnector 107 are formed on the substrate tube 103.

(Application of Slurry for Cathodes)

Then, slurry for cathodes is applied on a predetermined position of a sintered body (SA6). The slurry for cathodes is applied to a predetermined position on the co-sintered substrate tube 103 (or on the cathode reactive layer). The application amount is adjusted such that the thickness of the center portion of the cathode is from 1000 μm to 3000 μm.

Details of application of slurry for cathodes will be described later. The slurry for cathodes to be used is obtained, for example, by adding a vehicle such as squeegee oil to $LaSrMnO_3$ powder and mixing the resultant mixture.

In the case of providing the cathode reactive layer, slurry including the material of the cathode reactive layer is produced. The slurry for cathode reactive layers is applied to the predetermined position on the co-sintered substrate tube 103 by screen printing. The application amount is adjusted such that the thickness of the cathode reactive layer is from 10 to 100 μm. In the case of providing the cathode reactive layer as described above, the application amount is adjusted such that the total film thickness of the cathode reactive layer and the cathode at the center portion is from 1000 μm to 3000 μm.

(Sintering)

The sintered body with the slurry for cathodes applied is suspended and sintered in the atmosphere (SA7). The sintering is performed, for example, with use of an electric furnace. The sintering temperature is specifically 1100 C to 1250 C. The sintering temperature here is a temperature lower than the co-sintering temperature after the formation of the substrate tube to the interconnector. In the present embodiment, the shape of the cathode remains almost unchanged before and after the sintering.

According to the above-described steps, the cylindrical cell stack 101 as illustrated in FIG. 1 is manufactured.

Figure 4:
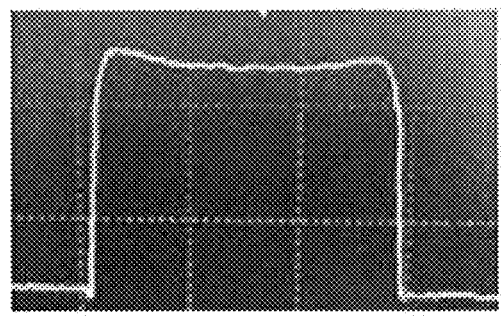
FIG. 4 illustrates a measurement result of a cross-sectional shape of the cathode according to the embodiment of the present invention which is formed on a substrate tube.

FIG. 4 illustrates a measurement result of a cross sectional shape of the cathode which is formed on the substrate tube. Viscosity of the slurry for cathodes was set to be 2.0 to 10.0 Pascal seconds, and after the application, the cathode was sintered at 1000 to 1600° C. FIG. 4 was obtained with use of a laser dimension measuring instrument.

According to the method of the present embodiment, the cathode was formed in which the slope of the end portion was sharp (H/L=7) and $d_1/d_0$ was 1.1.

In this way, when the portion of the cathode 113 in contact with the interconnector 107 is made to be thick, the end portion becomes thick, and thus, a current passing cross-sectional area increases. Moreover, when the slope of the end portion becomes sharp, the current passing cross-sectional area of the contact portion expands in the whole area in contact with the interconnector. Accordingly, resistance of the conductive path decreases. Further, increase in area where the interconnector 107 and the cathode 113 are in contact with each other leads to increase in adhesion strength between the interconnector 107 and the cathode 113, and thus, the strength of the cell stack is improved.

On the other hand, the center portion of the cathode 113 has a film thickness almost same as in the case of the conventional fuel cell. Compared with a case where a cathode having a rectangular cross section is formed, oxidation gas is easily transmitted, and also, the amount of the slurry to be used can be reduced.

Figure 5:
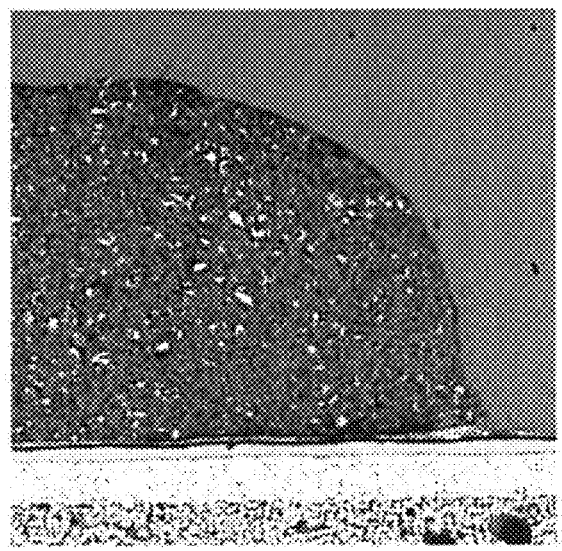
FIG. 5 is an SEM photograph of a cross-sectional shape of an end portion of a cathode in a Comparative Example.

As a Comparative Example, slurry for cathodes was applied on a smooth substrate tube with use of the dispenser disclosed by Japanese Unexamined Patent Application, Publication No. 2013-175305. More specifically, in FIG. 5, a nozzle having a substantially circular opening was used to discharge a liquid droplet of slurry for cathodes, and thus, a cathode was formed. FIG. 5 is a SEM photograph of a cross sectional shape of an end portion of the cathode of the Comparative Example.

In the Comparative Example, the formed cathode had an end portion having a gentle slope of H/L=1.1. With such shape, a region having a thin film thickness is increased at the end portion of the cathode, and especially in a case where power is generated with large current, increase in resistance of the conductive path is likely to occur.

Next, an application apparatus used in the step of application of the slurry for cathodes (step SA6 in FIG. 3) will be described in detail with reference to the drawings.

Figure 6:
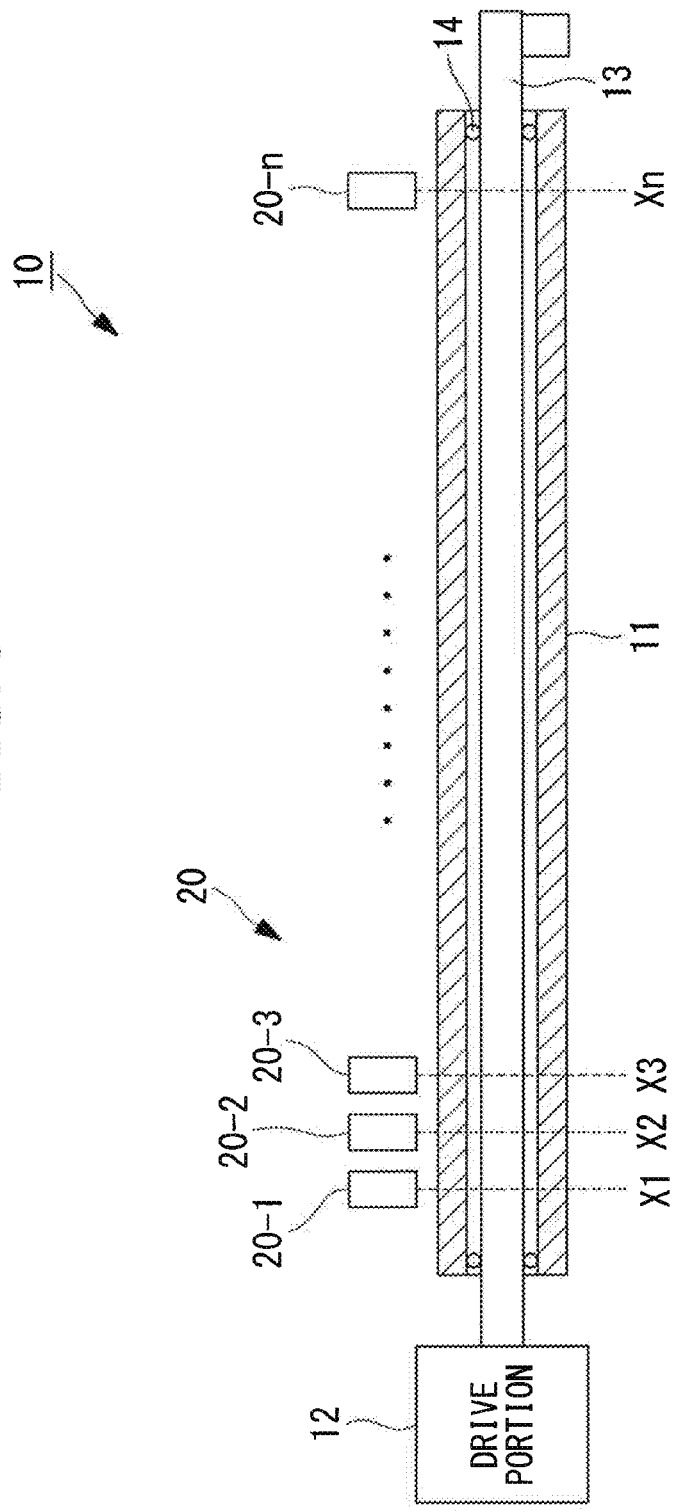
FIG. 6 is a diagram illustrating an entire schematic configuration of an application apparatus according to a first embodiment of the present invention.

FIG. 6 is a diagram illustrating an entire schematic configuration of the application apparatus 10 according to the first embodiment of the present invention. As illustrated in FIG. 6, the application apparatus 10 includes an drive portion 12 which rotates a sintered body 11, which is a long (approximately 1 m to 2 m, for example) cylindrical member, around an axis, and dispensers 20-1 to 20-n (hereinafter, all dispensers are denoted by reference numeral "20" simply, and each of the dispensers is denoted by reference numeral "20-1", "20-2", etc.) which are disposed respectively so as to correspond to application positions X1, X2, X3, ... Xn, which are set with intervals therebetween in an axis direction of the sintered body 11, and the dispensers apply slurry for cathodes (application material) such that the applied slurry has a predetermined width on an outer peripheral surface of the sintered body 11.

The respective dispensers 20-1 to 20-n are disposed such that the dispensers can move in the axis direction of the sintered body 11. Accordingly, for example, the dispensers 20-1 to 20-n can smoothly correspond to the application positions, which are set according to the respective sintered body 11, X1, X2, X3, ... Xn, respectively.

The sintered body 11 is a hollow member, and a shaft 13 is inserted in the hollow portion of the sintered body 11. The sintered body 11 is fixed to the shaft 13 by a fixation member 14, e.g., an O-ring. The shaft 13 is attached to a not-illustrated workpiece holder, and the shaft 13 is driven by the drive portion 12, and thereby, the sintered body 11, as well as the shaft 13, is rotated around the axis of the shaft 13.

Figure 7:
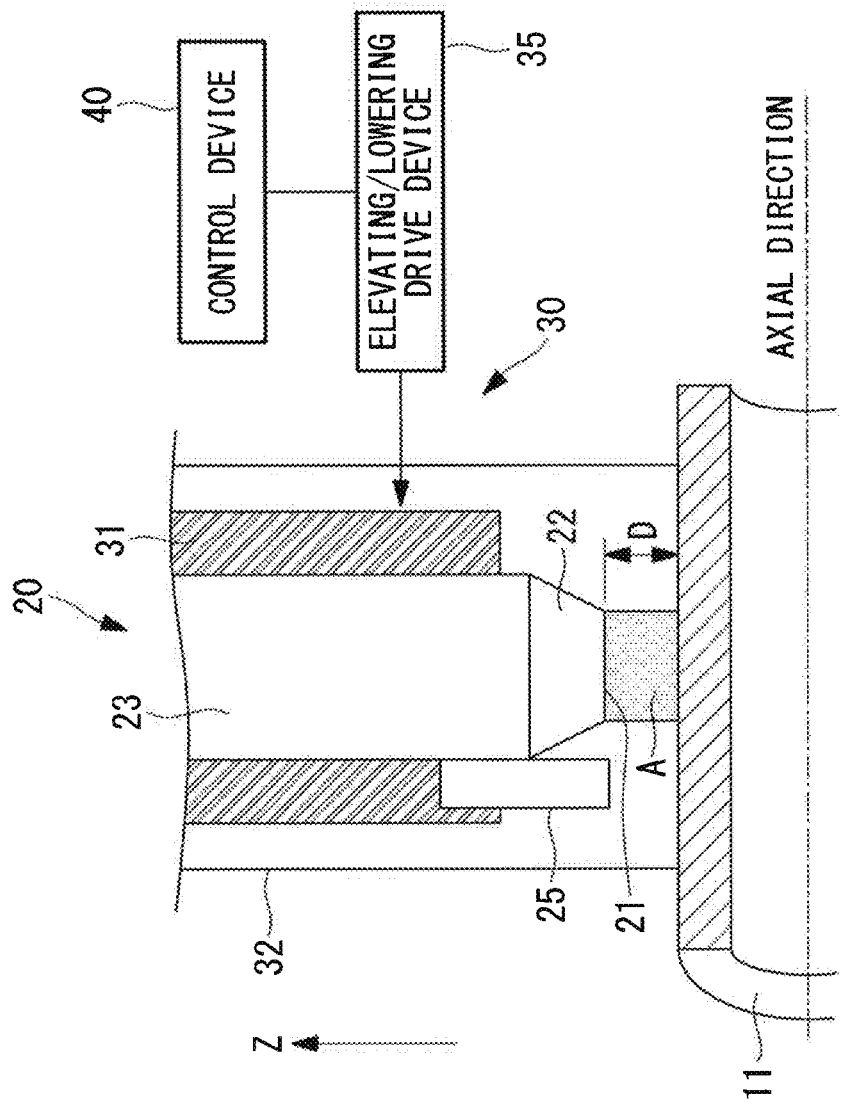
FIG. 7 is an enlarged schematic diagram illustrating dispensers and the periphery thereof in an enlarged manner.

FIG. 7 is an enlarged schematic diagram illustrating the dispensers 20 and the periphery thereof in an enlarged manner. As illustrated FIG. 7, the respective dispensers 20 include, for example, a nozzle 22 having the opening portion 21 disposed at a position opposite to the outer peripheral surface of the sintered body 11, a container 23 containing slurry for cathodes, an pressuring portion (not illustrated) pushing out the nozzle 22 by pressuring the slurry for cathodes contained in the container 23, and the like.

Figure 8:
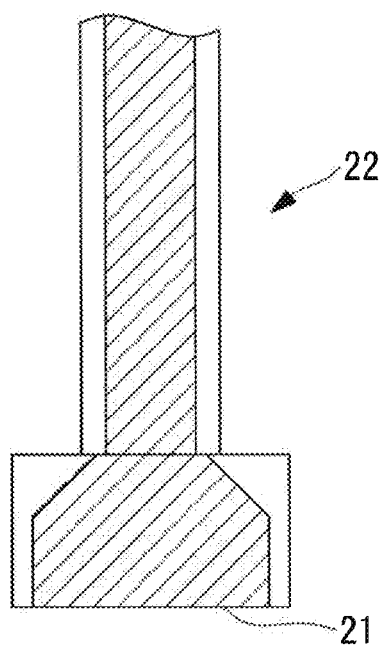
FIG. 8 is a schematic longitudinal section of a nozzle of a dispenser as an example.

In the dispensers 20, the slurry for cathodes contained in the container 23 is pushed out by the pressuring portion to be discharged from the opening portion 21 disposed at the distal end of the nozzle 22, whereby slurry for cathodes A is applied to the outer peripheral surface of the sintered body 11. The configuration of the dispensers 20 is not limited to the above example, as long as the configuration is that the slurry for cathodes A can be applied to the outer peripheral surface of the sintered body 11 by discharging the slurry for cathodes A from the opening portion 21. For example, the dispenser 20 may have a shape as illustrated in FIG. 8.

Figure 9:
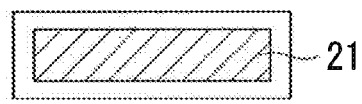
FIG. 9 is a diagram illustrating an example of an opening shape of an opening portion.

The opening portion 21 has a rectangular slit shape as illustrated FIG. 9, for example. The longer side of the opening portion 21 has a length substantially same as the width of the cathode 113 in the longitudinal direction of the substrate tube 103. Note that the opening shape of the opening portion 21 is not limited to the shape illustrated in FIG. 9.

As illustrated in FIG. 7, the dispenser 20 is provided with an elevating/lowering device (opening position adjustment portion) 30 which makes the position of the opening portion 21 movable in an upward/downward direction. For example, the elevating/lowering device 30 supports the dispenser 20, and also, includes a moving member (slider, for example) 31 which is attached to a base 32 so as to be capable of being elevated and lowered and a elevating/lowering drive device 35 which moves the moving member 31 upward or downward. The elevating/lowering drive device 35 is configured, for example, by a ball screw extending in the upward/downward direction, a nut disposed on the moving member in the state where the nut is screwed in the ball screw and can be rotated and the position of the nut is fixed, an electric motor (servo motor with an encoder) rotating the ball screw, and the like (none of them is illustrated). Note that the configuration of the elevating/lowering device 30 is not limited to the aforementioned configuration, and the known configuration can be applied as appropriate.

The elevating/lowering drive device 35 is controlled by a control device 40. For example, if the rotation of the servo motor included in the elevating/lowering drive device 30 is controlled by the control device 40, the moving member 31 can be moved to a desired position in the upward/downward direction, that is, the opening portion 21 can be moved to a desired position in the upward/downward direction. Specifically, the control device 40 controls the elevating/lowering drive device 30 such that a distance D between the opening portion 21 and the outer peripheral surface, more specifically, between a reference surface provided virtually on the opening portion 21 and the outer peripheral surface is fixed, based on adjustment information, which will be described below.

The dispenser 20 is provided with a displacement amount acquiring portion 25 that acquires a displacement amount of the outer peripheral surface of the sintered body 11 in a noncontact manner. The displacement amount acquiring portion 25 may be, for example, a displacement sensor, or the displacement amount acquiring portion 25 may have a configuration in which a displacement amount is obtained by executing a calculating processing of a detection signal of a distance sensor. Namely, as long as a displacement amount is finally obtained, a method for measuring the displacement amount or the like is not particularly limited.

Next, description will be given of procedures of steps for application of slurry for cathodes by the application apparatus 10 configured as above.

First, into the hollow portion of the sintered body 11 on the outer peripheral surface of which the anode 109, the solid electrolyte 111 and the interconnector 107 are formed, the shaft 13 is inserted to be fixed to a workpiece holder (not illustrated) thereby providing a state where the sintered body 11 can be rotated around the axis by the drive portion 12. At that time, the substrate tube 103 is attached to the workpiece holder (not illustrated) such that the longitudinal direction is substantially horizontal.

Subsequently, the application positions X1, X2, ... Xn, are set such that slurry for cathodes is applied on the upper portions of the solid electrolyte 111 and the interconnector 107, on the outer peripheral surface of the sintered body 11. At that time, the application positions may be set such that the end portion of the solid electrolyte 111 and the end portion of the interconnector 107 are slightly exposed. By setting the application positions X1 to Xn in the state where the sintered body 11 is set to the application apparatus 10, slurry for cathodes can be applied to an appropriate position. This is because performing a sintering step (see SA5 in FIG. 3), which is a step before the step of application of the slurry for cathodes, causes a miner deviation caused by a difference in shrinkage rate among the positions of the anode 109, the solid electrolyte 111 and the interconnector 107 which are formed on the outer peripheral surface of the substrate tube 103.

Subsequently, by sliding the dispensers 20-1 to 20-$n$ in the axial direction of the sintered body 11, the respective dispensers 20 are set at positions corresponding to the respective set application positions X1 to Xn. At that time, a tip portion of the nozzle 22 is disposed such that the longer side of the opening portion 21 is substantially parallel to the longitudinal direction of the sintered body 11.

Then, the drive portion 12 is driven to rotate the sintered body 11, and the displacement amount of the outer peripheral surface of the sintered body 11 at the respective application positions 20-1 to 20-$n$ is acquired by the displacement amount acquiring portion 25 which is attached to the respective dispensers 20-1 to 20-$n$. Examples of a method for acquiring the displacement amount include measuring an amount of displacement from the reference surface with a state before the rotation regarded as a reference.

Figure 10:
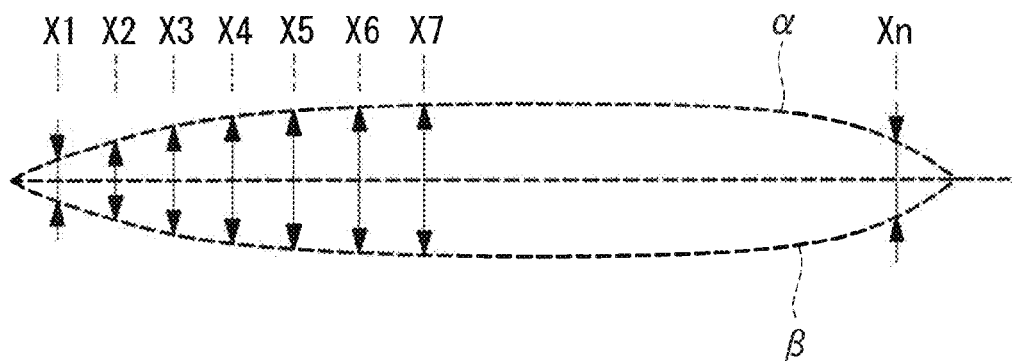
FIG. 10 is a diagram for explaining displacement of an outer peripheral surface caused by rotation of a sintered body.

For example, as illustrated in FIG. 10, if the sintered body 11 is at one rotation angle, the outer peripheral surface is in a state $\alpha$, and if the sintered body 11 is at another rotation angle, the outer peripheral surface is in a state $\beta$. In this way, the position of the outer peripheral surface of the sintered body 11 is displaced by the rotation, and also, the displacement amount is varied depending on the application positions X1 to Xn.

The displacement amount acquired by the displacement amount acquiring portion 25 is output to the control device 40 provided so as to correspond to the corresponding dispenser 20. Further, the control device 40 provided to the respective dispenser 20 acquires information on the rotation angle from a control device (not illustrated) controlling the drive portion 12, for example. The control device 40 creates adjustment information by associating the displacement amount input by the displacement amount acquiring portion 25 with the rotation angle input by the control device of the drive portion 12. The adjustment information is temporally stored in a storage portion (not illustrated) of the control device 40, and is referenced in control of the elevating/lowering drive device 35 at the time of subsequent application of slurry for cathodes. Here, the adjustment information may be prepared as a table in which the rotation angle and the displacement amount are associated, or may be one represented by continuous functions or the like.

When the adjustment information at the respective application positions X1 to Xn is obtained in this way, application of the slurry for cathodes is performed actually. More specifically, the drive portion 12 starts rotating the shaft 13, and thereby, the sintered body 11 is rotated around the axis (rotated at a rotational speed of 1 rotation per second, for example). In this state, the dispensers 20-1 to 20-$n$ are operated, the slurry for cathodes is continuously conveyed toward the tip of the nozzle 22, and the slurry for cathodes is discharged downwardly in the vertical direction from the opening portion 21 at the tip of the nozzle 22. Accordingly, the slurry for cathodes having the predetermined width and the predetermined film thickness is applied to the application positions X1 to Xn on the outer peripheral surface of the sintered body 11.

Figure 11:
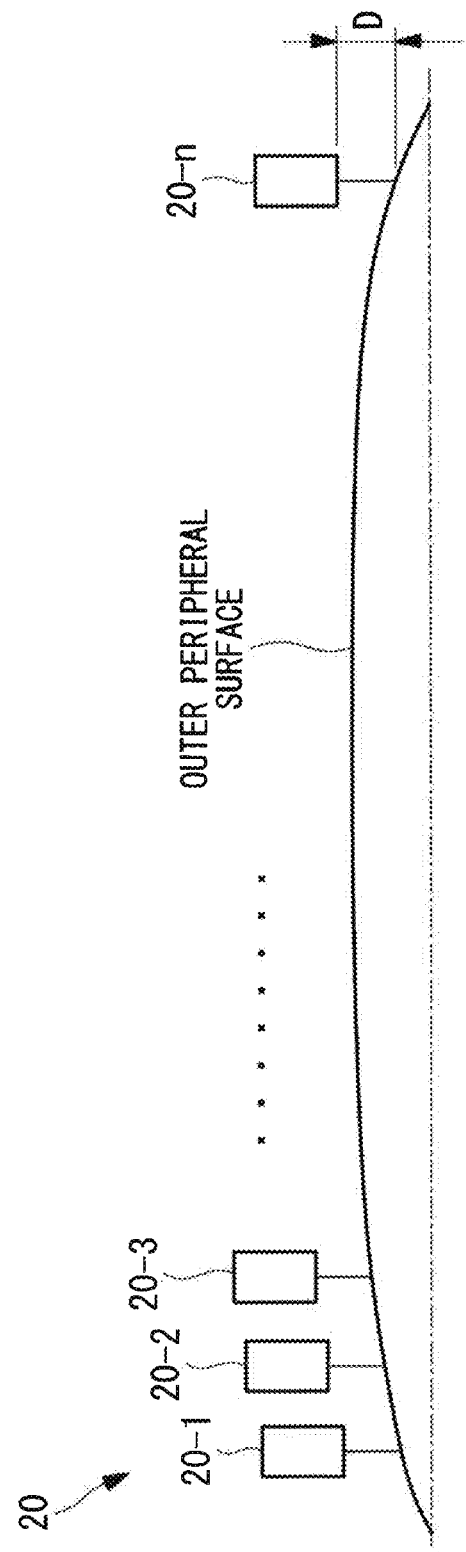
FIG. 11 is a diagram for explaining control of a distance between the opening portion and the outer peripheral surface performed by a control device.

At that time, the control device 40 controls the elevating/lowering drive device 35 in synchronization with the rotation of the sintered body 11 based on the adjustment information. More specifically, a displacement amount corresponding to the rotation angle of the sintered body 11 is read from the adjustment information, and the elevating/lowering drive device 35 is controlled such that the displacement amount is zero. Thereby, the position of the opening portion 21 is adjusted by the elevating/lowering drive device 35 such that the dispensers 20-1 to 20-$n$ maintain the distance D between the respective opening portion 21 and the outer peripheral surface of the sintered body 11 to be fixed, as illustrated in FIG. 11.

Figure 12:
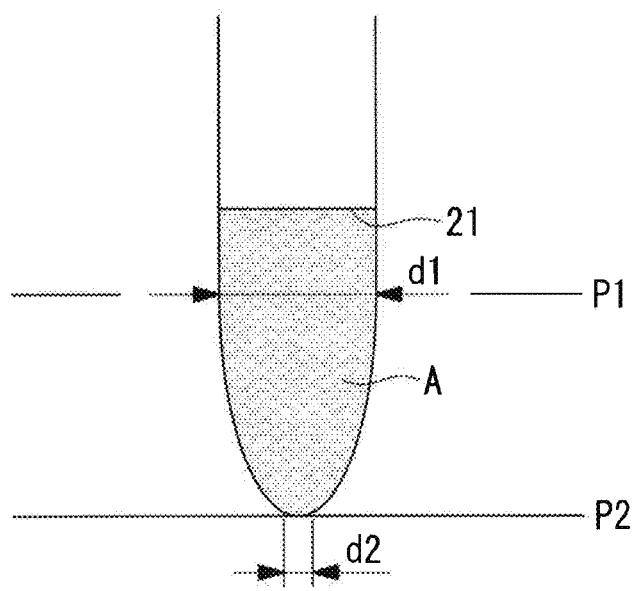
FIG. 12 is a diagram explaining a relationship of the distance between the opening portion and the outer peripheral surface and a width of an application surface of slurry for a cathode.

Here, as illustrated in FIG. 12, the width of slurry for cathodes to be applied to the outer peripheral surface is varied depending on the distance D. Specifically, if the outer peripheral surface is located at a position P2, the width of the application surface is d2, and if the outer peripheral surface is located at a position P1 which is closer to the opening portion 21 than the position P2, the application width is d1 (>d2). Therefore, the control device 40 controls a value of the distance D between the outer peripheral surface and the opening portion 21 such that the value is fixed to a width which is an appropriate distance previously obtained on the basis of the width of slurry for cathodes to be applied on the outer peripheral surface. In the present embodiment, the distance D is set to 2 mm, for example.

Furthermore, slurry for cathodes is discharged such that a discharge amount at both end portions of a slit is a little larger than a discharge amount at a center portion of the slit by adjusting the viscosity and extrusion speed of the slurry for cathodes. Accordingly, the film thickness of the center portion is small and the film thickness of the both end portions is large, as illustrated in FIG. 1 and FIG. 2. In order to obtain a desired film thickness of the cathodes and prevent the shape of the slurry for cathodes from changing immediately after the application, the viscosity of the slurry for cathodes and a clearance between the tip of the nozzle and the substrate tube at the application position is appropriately adjusted. The dispenser applies slurry to the cathode 113 so as not to apply the slurry to a seam portion repeatedly for preventing the cathode from being thickened.

When one or several rotations of the sintered body 11 causes application of a belt-like shape of slurry for cathodes to the application positions X1 to Xn of the sintered body 11 in this way, the dispenser 20 stops discharge of the slurry, the drive portion 12 stops the rotation of the shaft (sintered body), and the steps of application of the slurry for cathodes is ended.

As described so far, according to the application apparatus and the application method of the present embodiment, even if the sintered body 11 is warped by the gravity or the rotation causes displacement of the position of the outer peripheral surface, the distance between the outer peripheral surface and the opening portion 21 can be maintained to be fixed. Consequently, the substantially fixed width of slurry for cathodes can be applied to the outer peripheral surface of the sintered body 11. Furthermore, as illustrated in FIG. 7 and FIG. 9, slurry for cathodes having a width is discharged from the opening portion 21 to be applied to the outer peripheral surface, and thus, a time period required for the application can be reduced, compared with a case in which application is performed by spraying slurry for cathodes (for example, the time period can be reduced to one twenties). Moreover, even wear of a machine is small compared with a case in which slurry for cathodes is sprayed, and thus, the exchange frequency of components decreases and cost reduction can be promoted.

Second Embodiment

Figure 13:
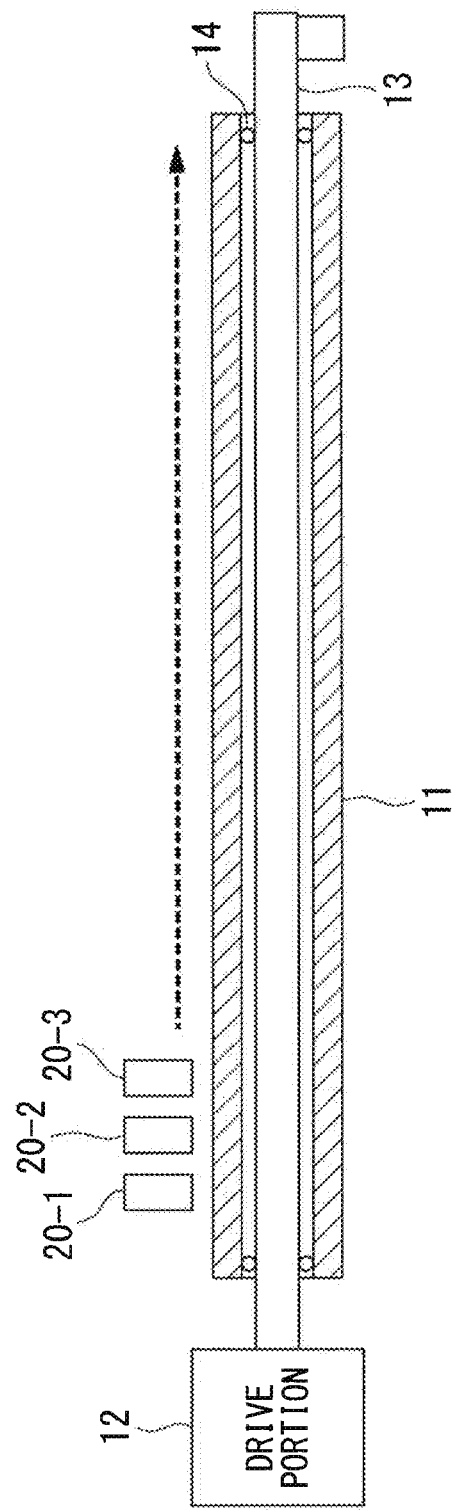
FIG. 13 is a diagram illustrating an entire schematic configuration of an application apparatus according to a second embodiment of the present invention.

In the aforementioned first embodiment, the dispensers 20 are each disposed with respect to the application positions X1 to Xn, but the present invention is not limited to this. For example, as illustrated in FIG. 13, by sliding one or more dispensers 20 in the axial direction of the sintered body 11, slurry for cathodes may be sequentially applied to the respective application positions. FIG. 13 illustrates a case in which three dispensers 20-1, 20-2, and 20-3 are slid in an axial direction. Reduction in the number of the dispensers 20 in this way can promote cost reduction.

Third Embodiment

Figure 14:
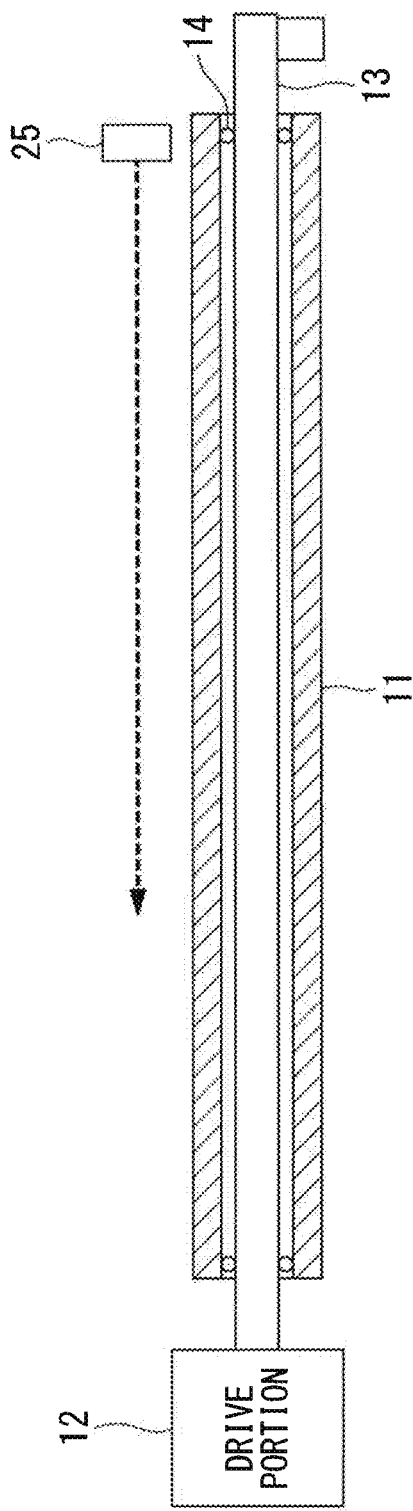
FIG. 14 is a diagram for explaining an application apparatus according to a third embodiment of the present invention.

In the aforementioned first embodiment, the displacement amount acquiring portions 25 are each provided to the respective dispensers 20. Instead of the first embodiment, however, one or more displacement amount acquiring portions 25 may be provided separately from the dispensers 20, the displacement amount acquiring portions 25 may be slid to be disposed at the application positions X1 to Xn before the dispensers 20 performs application, thereby the displacement amounts at the application positions X1 to Xn may be measured, as illustrated in FIG. 14. In this case, the number of the displacement amount acquiring portions 25 to be set can be reduced, and cost reduction can be promoted.

The application apparatus and the application method for cathodes described above can be also applied for forming the anode 109, the solid electrolyte film 111, the interconnector 107 and the cathode reactive layer. If the application apparatus and the application method according to the embodiments are used instead of screen printing, accuracy of an application shape is made to be stable. Also, position accuracy is improved, and thus, an invalid area can be reduced, which is advantageous. Furthermore, the application apparatus and the application method of the aforementioned embodiments, without being limited to SOFCs, can be applied widely to a case where an application material is applied to an outer peripheral surface of a rotating cylindrical member.

The present invention is not limited only to the aforementioned embodiments. Various modifications can be made within the scope of the present invention, for example, by combining the aforementioned embodiments partially or entirely.

REFERENCE SIGNS LIST 10 application apparatus
11 sintered body
12 drive portion
13 shaft
20 (20-1, 20-2, 20-3, 20-n) dispenser
21 opening portion
22 nozzle
23 container
30 elevating/lowering device
31 moving member
32 base
35 elevating/lowering drive device
40 control device
101 cell stack
103 substrate tube
105 fuel cell
107 interconnector
109 anode
111 solid electrolyte film
113 cathode
115 lead film
A slurry for cathodes

What is claimed is:
1. A fuel cell comprising:
a cell stack in which a cell including an anode, a solid electrolyte film and a cathode on an outer peripheral surface of a substrate tube is formed in a circumferential direction of the substrate tube, a plurality of the cells are arranged along a longitudinal direction of the substrate tube, and an interconnector connecting the cells electrically in series is formed between the adjacent cells, wherein a thickness of an end portion of the cathode in the longitudinal direction, the portion being in contact with the interconnector, is larger than a thickness of a center portion of the cathode in the longitudinal direction.

2. The fuel cell according to claim 1, wherein the thickness of the end portion of the cathode is more than 1 and 1.5 or less times the thickness of the center portion of the cathode.

3. The fuel cell according to claim 1, wherein the end portion of the cathode in the longitudinal direction has a sharp slope.

4. An application apparatus used for manufacturing the fuel cell according to claim 1, comprising:

a dispenser including an opening portion disposed at a position opposite to the outer peripheral surface of the substrate tube attached in a rotatable manner around an axis, the dispenser discharging slurry for cathodes from the opening portion and applying the slurry for cathodes to predetermined positions on the anode, the solid electrolyte film and the interconnector, wherein the dispenser applies the slurry for cathodes so as to make the thickness of the end portion in the longitudinal direction, the portion being in contact with the interconnector, larger than the thickness of the center portion in the longitudinal direction.

5. The application apparatus according to claim 4, further comprising:

an opening position adjustment portion disposed so as to correspond to the dispenser and configured to allow change of a position of the opening portion;

a displacement amount acquiring portion configured to acquire a displacement amount of the outer peripheral surface at the time of rotating the substrate tube at a predetermined application position in an axial direction of the substrate tube;

a storage portion configured to store adjustment information associated with the displacement amount and a rotation angle around an axis; and a control portion configured to control the opening position adjustment portion in conjunction with rotation of the substrate tube so as to fix a distance between the outer peripheral surface of the substrate tube and the opening portion based on the adjustment information stored in the storage portion, on application of the slurry for cathodes.

6. The application apparatus according to claim 5, wherein a plurality of the application positions are set with intervals therebetween along the axial direction of the substrate tube, the dispensers are each disposed so as to correspond to the respective application positions, and the control portion controls the opening position adjustment portion corresponding to each of the dispensers based on the adjustment information prepared for each of the application positions.

7. The application apparatus according to claim 5, wherein N number of the application positions are set with intervals therebetween along the axial direction of the substrate tube, one or M number (M<N) of the dispensers are sequentially disposed at the N number of the application positions by sliding in the axial direction of the substrate tube, and the control portion controls the opening position adjustment portion corresponding to each of the dispensers based on adjustment information prepared for each of the application positions.

8. A method for manufacturing a fuel cell including a cell stack in which a cell including an anode, a solid electrolyte film and a cathode on an outer peripheral surface of a substrate tube is formed in a circumferential direction of the substrate tube, a plurality of the cells are arranged along a longitudinal direction of the substrate tube, and an interconnector connecting the cells electrically in series is formed between the adjacent cells, the method comprising:

an application step of discharging slurry for cathodes to configure the cathode on the outer peripheral surface of the substrate tube from an opening portion of a dispenser by rotating the substrate tube in the circumferential direction and applying the slurry for cathodes to predetermined positions on the anode, the solid electrolyte film and the interconnector; and a sintering step of sintering the substrate tube to which the slurry for cathodes is applied, wherein in the application step, the slurry for cathodes is applied so as to make a thickness of an end portion in the longitudinal direction, the end portion being in contact with the interconnector, larger than a thickness of a center portion in the longitudinal direction.

9. The method for manufacturing a fuel cell according to claim 8, wherein the slurry for cathodes is discharged so as to make the thickness of the end portion more than 1 and 1.5 or less times the thickness of the center portion.

10. The method for manufacturing a fuel cell according to claim 8, wherein the slurry for cathodes is applied such that the end portion in the longitudinal direction has a sharp slope.

11. The method for manufacturing a fuel cell according to claim 8, wherein the application step includes:

a step of acquiring a displacement amount of the outer peripheral surface of the substrate tube at the time of rotating the substrate tube at a predetermined application position in an axial direction of the substrate tube;

a step of creating adjustment information associated with the displacement amount and a rotation angle around an axis; and a step of adjusting a position of the opening portion in conjunction with rotation of the substrate tube so as to fix a distance between the outer peripheral surface of the substrate tube and the opening portion based on the adjustment information, on application of the slurry for cathodes.

12. The method for manufacturing a fuel cell according to claim 11, further comprising:

a step of setting a plurality of the application positions with intervals therebetween along the axial direction of the substrate tube;

a step of disposing the dispensers so as to correspond to the respective application positions; and a step of adjusting a distance between the respective opening portion and the outer peripheral surface of the substrate tube based on the adjustment information prepared for each of the application positions.

13. The method for manufacturing a fuel cell according to claim 11, further comprising:

a step of setting N number of the application positions with intervals therebetween along the axial direction of the substrate tube;

a step of disposing sequentially one or M number (M<N) of the dispensers at the N number of the application positions by sliding in the axial direction of the substrate tube; and a step of adjusting a distance between the opening portion of each of the dispensers and the outer peripheral surface of the substrate tube based on the adjustment information prepared for each of the application positions.

* * * * *